(12) United States Patent
Kemp

(10) Patent No.: US 7,929,148 B2
(45) Date of Patent: Apr. 19, 2011

(54) OPTICAL COHERENCE TOMOGRAPHY IMPLEMENTATION APPARATUS AND METHOD OF USE

(75) Inventor: Nathaniel J. Kemp, Austin, TX (US)

(73) Assignee: Volcano Corporation, San Diego, CA (US)

( * ) Notice: Subject to any disclaimer, the term of this patent is extended or adjusted under 35 U.S.C. 154(b) by 354 days.

(21) Appl. No.: 12/018,706

(22) Filed: Jan. 23, 2008

(65) Prior Publication Data

US 2008/0180683 A1 Jul. 31, 2008

Related U.S. Application Data

(60) Provisional application No. 60/886,226, filed on Jan. 23, 2007.

(51) Int. Cl.
*G01B 11/02* (2006.01)
*G01B 9/02* (2006.01)

(52) U.S. Cl. .................. 356/497; 356/479; 356/492

(58) Field of Classification Search .............. 356/479, 356/491–495, 497
See application file for complete search history.

(56) References Cited

U.S. PATENT DOCUMENTS

| | | | | |
|---|---|---|---|---|
| 5,202,745 A * | 4/1993 | Sorin et al. | .................. | 356/73.1 |
| 5,396,328 A | 3/1995 | Jestel et al. | .................. | 356/358 |
| 5,541,730 A * | 7/1996 | Chaney | .................. | 356/482 |
| 6,208,415 B1 | 3/2001 | De Boer et al. | .................. | 356/351 |
| 6,665,456 B2 | 12/2003 | Dave et al. | .................. | 385/11 |
| 6,738,144 B1 * | 5/2004 | Dogariu | .................. | 356/479 |
| 6,961,123 B1 | 11/2005 | Wang et al. | .................. | 356/364 |
| 7,042,573 B2 | 5/2006 | Froggatt | .................. | 356/479 |
| 7,190,464 B2 * | 3/2007 | Alphonse | .................. | 356/479 |
| 2002/0196446 A1 | 12/2002 | Roth et al. | .................. | 356/479 |
| 2005/0140981 A1 * | 6/2005 | Waelti | .................. | 356/479 |
| 2005/0213103 A1 | 9/2005 | Everett et al. | .................. | 356/479 |
| 2005/0264823 A1 * | 12/2005 | Zhu et al. | .................. | 356/493 |
| 2006/0038115 A1 | 2/2006 | Maas | .................. | 250/227.18 |
| 2006/0279743 A1 * | 12/2006 | Boesser et al. | .................. | 356/500 |
| 2007/0161893 A1 | 7/2007 | Milner et al. | .................. | 600/425 |
| 2008/0285043 A1 * | 11/2008 | Fercher et al. | .................. | 356/451 |

FOREIGN PATENT DOCUMENTS

WO WO 2004-096049 11/2004

OTHER PUBLICATIONS

Goetzinger, et al., "High speed spectral domain polarization sensitive optical coherence tomography of the human retina," Optics Express, vol. 13, No. 25, pp. 10217-10229, (2005).
Kemp, et al., "Depth-Resolved Optic Axis Orientation in Multiple Layered Anisotropic Tissues Measured with Enhanced Polarization-Sensitive Optical Coherence Tomography (EPS-OCT)," Optics Express, vol. 13, No. 12, pp. 4507-4518, (2005).

(Continued)

*Primary Examiner* — Michael A Lyons
(74) *Attorney, Agent, or Firm* — J. Peter Paredes; Rosenbaum & Silvert, P.C.

(57) ABSTRACT

Provided herein are systems, methods, and compositions for optical coherence tomography implementations. The OCT implementation generally applies to both spectrometer-based and swept source-based implementations of PS-FD-OCT, and also to both fiber based and bulk-optical and Michelson and Mach-Zender PS-OCT implementations, where the detection arm is free from two photoreceivers or spectrometers for detecting the interference of the first polarization state and the second polarization state.

20 Claims, 4 Drawing Sheets

OTHER PUBLICATIONS

Park, et al., "Real-time fiber-based multi-functional spectral-domain optical coherence tomography at 1.3um," Optics Express, vol. 13, No. 11, pp. 3931-3944, (2005).

Pasquesi, et al., "In vivo detection of exercise induced ultrastructural changes in genetically-altered murine skeletal muscle using polarization-sensitive optical coherence tomography," Optics Express, vol. 14, No. 4, pp. 1547-1556, (2006).

Soller, et al., "Polarization diverse optical frequency domain interferometry: All coupler implementation," Bragg Gratting, Photosensitivity, and Poling in Glass Waveguides Conference, MB4, pp. 30-32, (2003).

Yasuno, et al., "Polarization-sensitive complex Fourier domain optical coherence tomography for Jones matrix imaging of biological samples," Applied Physics Letters, vol. 85, No. 15, pp. 3023-3025, (2004).

Zhang, et al., "Full range polarization-sensitive Fourier domain optical coherence tomography," Optics Express, vol. 12, No. 24, pp. 6033-6039, (2004).

* cited by examiner

OPTICAL COHERENCE TOMOGRAPHY IMPLEMENTATION APPARATUS AND METHOD OF USE

CROSS-REFERENCE TO RELATED APPLICATIONS

The present application claims the benefit of U.S. Provisional Application Ser. No. 60/886,226, filed Jan. 23, 2007. The aforementioned application is herein incorporated by reference in its entirety.

BACKGROUND OF THE INVENTION

The present invention relates generally to Optical Coherence Tomography ("OCT"), and more specifically to OCT implementations.

In OCT, light from a broad band light source is split by an optical fiber splitter with one fiber directing light to a sample path and the other optical fiber directing light to a reference path mirror. The distal end of the sample path can be interfaced with a scanning device, or the like. The reflected light from the scanning device is recombined with the signal from the reference mirror forming interference fringes, allowing precise depth-resolved imaging or optical measurements to be taken. Conventional OCT thus measures spatially resolved backscattered intensity with a resolution on the order of a few micrometers.

Fourier domain OCT ("FD-OCT"), sometimes known as Spectral Domain OCT ("SD-OCT"), can obtain a high sensitivity and imaging speed. And polarization sensitive Fourier domain OCT ("PS-FD-OCT") can reveal birefringence, diattenuation, and polarization sampling by measuring the change in polarization state. The implementation of polarization sensitivity into FD-OCT has been demonstrated. However, the FD-OCT systems which implement polarization sensitivity have developed with dual-channel detection paths, with either two separate spectrometers, two separate line-scan cameras, or two separate lines on an area-scan camera to capture in parallel the spectral interferogram for two orthogonal polarization modes. Swept source implementations of PS-FD-OCT have employed two detection channels in a configuration similar to time-domain PS-OCT; however the cost associated with an additional dual-balanced photoreceiver and digital acquisition channel can be substantial. These approaches necessitate very precise relative alignment between the two polarization-detecting elements to overcome misalignment-associated artifacts, such as birefringence offset. Additionally, the monetary cost associated with additional detection elements is substantial. The present invention attempts to solve these problems, as well as others.

SUMMARY OF THE INVENTION

Provided herein are systems and methods for optical coherence tomography implementations. Generally speaking, the OCT implementation comprises at least two reference paths having a difference in optical path length or time delay, wherein each reference path is associated with a mutually orthogonal polarization state.

The systems and methods are set forth in part in the description which follows, and in part will be obvious from the description, or can be learned by practice of the systems and methods. The advantages of the systems and methods will be realized and attained by means of the elements and combinations particularly pointed out in the appended claims. It is to be understood that both the foregoing general description and the following detailed description are exemplary and explanatory only and are not restrictive of the systems and methods, as claimed.

BRIEF DESCRIPTION OF THE FIGURES

The accompanying drawings, which are incorporated in and constitute a part of this specification, illustrate aspects of the systems and methods and together with the description, serve to explain the principles of the systems and methods.

DETAILED DESCRIPTION OF THE PREFERRED EMBODIMENTS

The systems and methods can be understood more readily by reference to the following detailed description of the systems and methods and the Examples included therein and to the Figures and their previous and following description.

Generally speaking, the OCT implementation 10 comprises at least two reference paths having a difference in optical path length or time delay, wherein each reference path is associated with a mutually orthogonal polarization state. The OCT implementation generally applies to both spectrometer-based and swept source-based implementations of PS-FD-OCT, and also to both fiber based and bulk-optical and Michelson and Mach-Zender PS-OCT implementations.

"Implementation" is any instrument or part compatible with the general OCT system in the respective subpart of the OCT system. Generally speaking, the subparts of the OCT system include a light source, a source path, a reference path, and a sample path.

Figure 1:
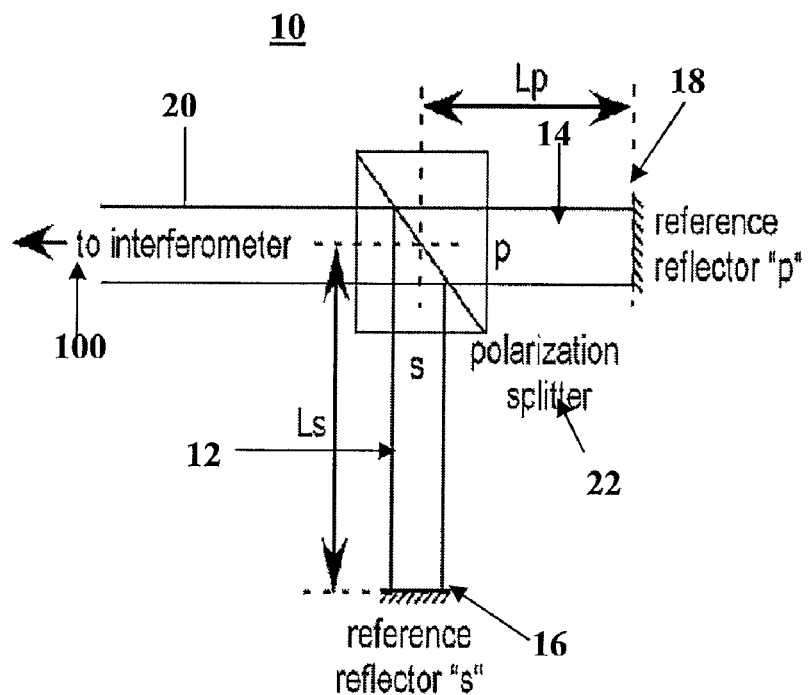
FIG. 1 is a diagram of one embodiment of the OCT implementation.

In one embodiment of the invention, the OCT implementation 10 comprises two reference paths 12 and 14 having a difference in optical path length or time delay, as shown in FIG. 1. A reference arm 20 of an interferometer 100 is optically coupled to a polarization splitter 22, in order to split the reference arm into a first reference path 12 and a second reference path 14 with two polarization states s and p, respectively. The first reference path 12 has an optical path length of Ls and the second reference path 14 has an optical path length of Lp. Each reference path 12 and 14 includes a first reference reflector 16 and a second reference reflector 18, whereby each reference path 12 and 14 transmits one of any two arbitrary but orthogonal polarization states s and p back to through the reference arm 20 to a single detection path with a single detector or a line-scan camera. In the embodiment shown in FIG. 1, the first and second reference reflectors 16 and 18 are perpendicular to each other, in order to obtain separation between polarization images in image depth scans. The first and second reference paths 12 and 14 can be an optical fiber, single mode fiber, multi-mode fiber, and the like. For phase sensitive PS-FD-OCT, the first and the second reference reflectors 16 and 18 are mechanically stable with respect to each other. Such mechanical stability reduces vibration from environmental sources and prevents differential polarization states and unknown phase variation, which is difficult to recalibrate.

The interference fringes for two arbitrary orthogonal polarization states s and p are multiplexed by frequency into two distinct regions of a single spectral scan, two distinct regions of scan depth, by providing a differential delay ($\tau_{sp}$) between two arbitrary orthogonal polarization (s and p) in the reference arm 20. The interference fringes for the two polarization states s and p which arise upon combination with light returning from the sample are divided into two separate frequency bands with a difference in Fourier-transformed scan depth corresponding to the difference in optical path length (Lp–Ls) between the two reference reflectors 16 and 18. The effective imaging depth is reduced by a factor of two, but polarization information previously available only with dual-channel detection is now acquired in a single spectrum acquisition of a single detection channel. A dual-channel detection system can be seen in FIG. 5.

Figure 2:
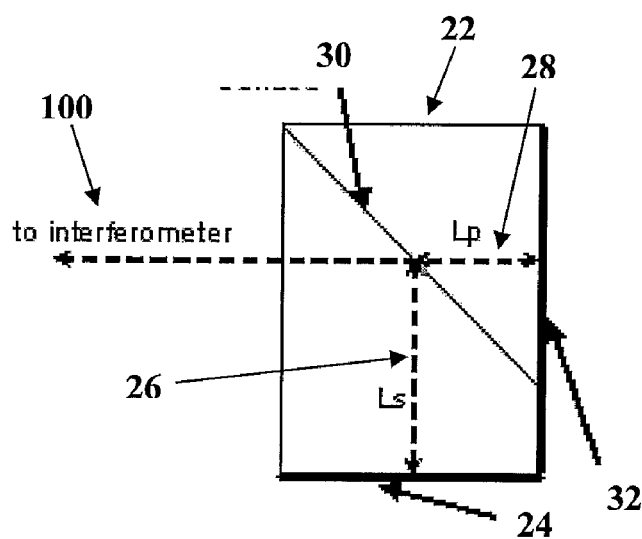
FIG. 2 is an enlarged diagram of the polarization beam splitter.

In another embodiment of the invention, as shown in FIG. 2, the reference path leads to a polarization beam splitter 22 that splits and combines two perpendicular polarized light beams s and p with respective reference path lengths 26 and 28 back to the interferometer 100. The polarization beam splitter 22 includes a polarizing beam splitter surface 30 and at least two mirrored surfaces 24 and 32 coupled to the reference path lengths 26 and 28. The performance of the polarization beam splitter 22 depends on the coating specifications of the beam splitter surface 30 and the mirrored surfaces 24 and 32. As such, these coatings can be optimized to maintain the polarization states along the optical pathlength Ls and Lp of the respective reference path lengths 28 and 28. And the construction of the polarization beam splitter 22 can be accomplished by trimming a standard polarizing beamsplitter cube and optically polishing one facet to make a rectangular solid, and then mirroring two adjacent sides for retro-reflecting the states of polarization with differential delay ($\tau_{sp}$).

Figure 3:
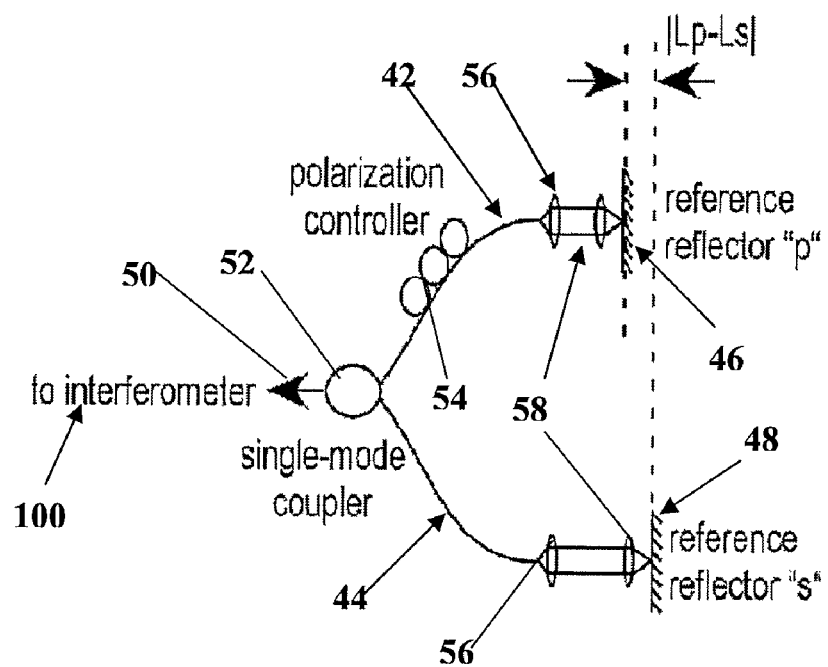
FIG. 3 is a diagram of an alternative embodiment of the OCT implementation.

Another embodiment of the invention is shown in FIG. 3, where the OCT implementation 10 comprises a single mode coupler 52 coupled to the reference arm 50 to split the reference arm 50 into the a first reference path 42 and a second reference path 44. The first reference path 42 includes an optical path length of Lp, while the second reference path 44 includes an optical path length of Ls. Alternatively, the first reference path 42 is coupled to a polarization controller 54 to control the polarization state of light. Each reference arm 42 and 44 includes a collimator 56 to collimate light onto a lens 58 to focus light onto a first reference reflector 46 and a second reference reflector, 48, respectively. The interference fringes for the two polarization states s and p which arise upon combination with light returning from the sample are divided into two separate frequency bands with a difference in Fourier-transformed scan depth corresponding to the difference in optical path length between the two reference reflectors (Lp–Ls).

Figure 4:
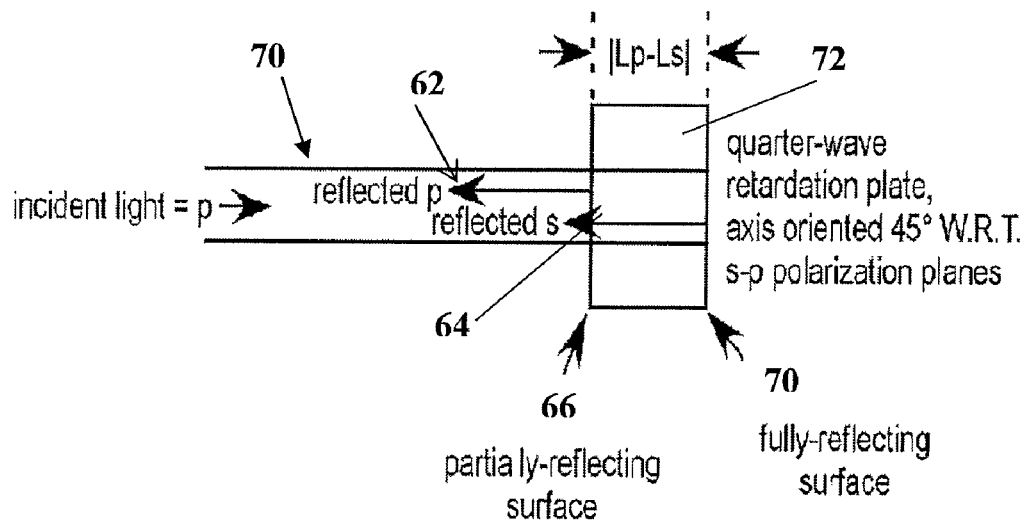
FIG. 4 is a diagram of an alternative embodiment of the OCT implementation.

Another embodiment of the invention is shown in FIG. 4, where the OCT implementation 10 comprises a quarter-wave plate retardation plate 72 coupled to the reference arm 70. The quarter-wave plate retardation plate 72 includes a partially reflecting surface 66 and a fully reflecting surface 68, where the axis of the quarter wave retardation plate 72 is oriented at 45 degrees with respect to the s and p polarization planes. The s polarization plane is reflected off the fully reflecting surface 68 and the p polarization plane is reflected off the partially reflecting surface 66. As a result, the reflected p polarization plane is reflected with an optical path length of Lp and the reflected s polarization plane is reflected with an optical path length of Ls. The interference fringes for the two polarization states s and p which arise upon combination with light returning from the sample are divided into two separate frequency bands with a difference in Fourier-transformed scan depth corresponding to the difference in optical path length between the two reference reflectors (Lp–Ls).

Figure 5:
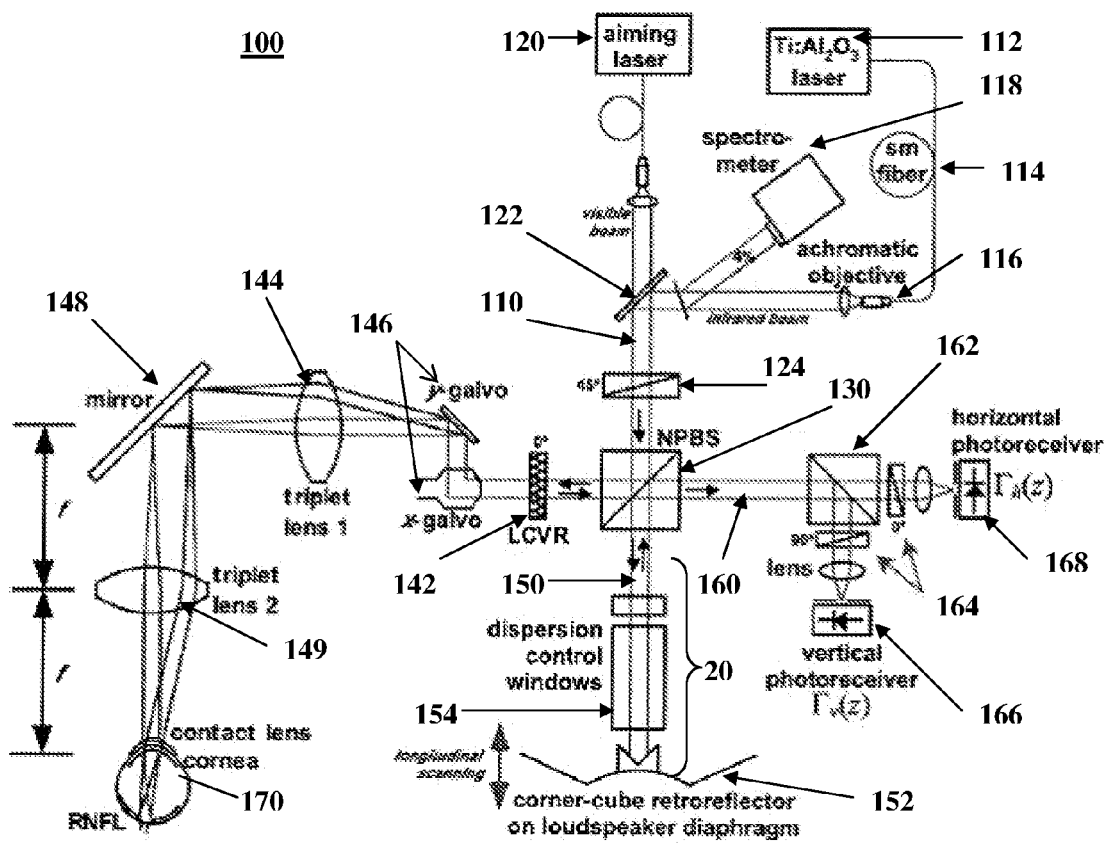
FIG. 5 is a schematic diagram of a polarization sensitive OCT system.

In operation, the reference arm 20 receives light from a non-polarizing beam splitter in a polarization sensitive OCT ("PS-OCT") system 100, as shown in FIG. 5. The PS-OCT system 100 can be readily understood by an article by the inventor entitled "Depth Resolved Optic Axis Orientation in Multiple Layered Anisotropic Tissues Measured with Enhanced Polarization Sensitive Optical Coherence Tomography", Optics Express 13(12), 4507-4518 (2005), hereby incorporated by reference. More particularly, Phase Resolved Polarization Sensitive Optical Coherence Tomography is used to measure change in optical path length and form birefringence. The PS-OCT system measures form birefringence by calculating the phase retardation between orthogonal components of polarized light, resolved along the fast and slow axes of the OCT implementation 10. A standard analysis of interference fringes formed between light reflecting from the two reference surfaces and a sample under testing is completed to determine the optical path length and depth resolved polarization state of light reflecting from the sensor. The PS-OCT system 100 measures the differential optical pathlength between light oscillating parallel and perpendicular to the sample under testing. The PS-OCT system 100 detects the phase retardation between the orthogonal light oscillations in the OCT implementation 10.

As shown in FIG. 5, the PS-OCT system includes a source path 110. In one embodiment, the source path 110 includes a light source comprising a Ti: $Al_2O_3$ mode-locked femtosecond laser 112 operating at a 88-MHz pulse repetition rate, a center wavelength $\lambda_o$=830 nm, and spectral bandwidth $\Delta\lambda$=55 nm Full Width Half Maximum ("FWHM"). One controls the optical power injected into the interferometer 100 by varying the coupling efficiency of Ti: $Al_2O_3$ laser light into a 30 m segment of single-mode optical fiber 114. Light that exits the source path 110 is collimated in open air and injected into the interferometer 100 with an achromatic microscope objective 116 (N.A. =0.3) giving a Gaussian beam profile with a FWHM diameter of 2 mm. To monitor source spectral quality, a spectrometer 118 connected to a personal computer detects the incident spectrum as sampled from a glass microscope slide. To allow viewing of the incident beam location on the tissue specimen, visible red light ($\lambda_o$=660 nm), emitted by a diode laser 120, is coupled into a multimode fiber, collimated, and combined with the source beam by a dichroic mirror 122. A Glan-Thompson prism polarizer 124 is oriented at 45° to ensure that light injected into the interferometer 80 has equal amplitudes and zero relative phase in horizontal and vertical polarization channels. The angular orientation of all PS-OCT polarization elements is measured clockwise with respect to the horizontal plane (x axis) viewed along the beam propagation direction (z axis); the y-axis is parallel to the Earth's gravitational field.

The PS-OCT system 100 includes a 50/50 nonpolarizing broadband cube beam splitter ("NPBS") 130 that divides the source beam into reference 150 and sample 140 paths. Reference path optics include a retroreflector 152 mounted on a loudspeaker diaphragm and glass windows 154 to match material dispersion of both the liquidcrystal variable retarder 142 ("LCVR") and two triplet lenses 144 in the sample path 140. For longitudinal scanning, a sinusoidal voltage is applied to a voice coil actuator that translates (in the z-direction) a corner-cube retroreflector 152 mounted to the loudspeaker diaphragm. A scan rate of 30 A-scans/sec and a scan depth of 1 mm (in air) are set by the voice coil actuator.

The PS-OCT instrument 100 includes a sample path with a LCVR 142, an x- and y-scanning galvanometer mirrors 146, a silver-coated mirror 148, and an afocal triplet lens pair 144 and 149. To provide a user-defined polarization state incident on the tissue specimen, the LCVR 142 is oriented with the fast axis at 0° and a voltage is applied to produce a user-specified retardation. The x- and y-scanning galvanometer mirrors 146 are oriented in orthogonal planes and deflected to provide lateral scanning of the sample beam on the tissue specimen 170. The center position between the galvanometer mirrors 146 is set at the front focal point of a high-N.A. achromatic triplet lens 144 (f=50.8 mm). The triplet lens 144 focuses the light and converts an angular displacement from the galvanometer mirrors 146 into a lateral displacement in the lens's rear focal plane. Light is reflected downward by a silver-coated mirror 148, and a second high-N.A. achromatic triplet lens 149 (f=50.8 mm) forms a unity-magnification afocal system. Triplet lens 149 recollimates the light and converts the lateral beam translation back into an angular deflection so that galvanometer rotation produces a scan pivoting about the back focal point of triplet lens 149. For nonretinal specimens, an achromatic scanning lens (f=7.9 mm) located in the rear focal plane of triplet lens 149 focuses the light onto the tissue specimen 170. For retinal scanning in intact eyes, the pupil is located in the rear focal plane of triplet lens 149, and the cornea focuses light onto the retinal surface. Material dispersion from intraocular fluid is balanced by a saline-filled cuvette in the reference path.

Light returning from sample 140 and reference 150 paths recombines, interferes in the NPBS, and is diverted into a detection path 160. A polarizing beam splitter 162 reflects vertically polarized light and transmits the horizontally polarized light. To reduce cross coupling between channels due to imperfect beam splitter polarization separation, beams pass through additional polarizers 164 oriented at 0° in the horizontal beam and 90° in the vertical beam. The horizontally and vertically polarized beams are each focused by an achromatic lens (f=35 mm) through a 30-mm-diameter pinhole and into two silicon photoreceivers 166, 168 to measure horizontal and vertical interference fringes versus depth Gh(z) and Gv(z). Gh(z) and Gv(z) are prefiltered to remove noise outside the signal bandwidth and then digitized for coherent demodulation and processing on a personal computer. With the OCT implementation 10, a single photoreceiver may be used.

The OCT implementation 10 is incorporated into the reference path 150, as to allow the detection path 160 to be free from the two photoreceivers 166 and 168 for the vertical and horizontal beams, but rather a single photoreceiver which detects both the vertical and horizontal beams by the OCT implementation 10 in the reference path 150. It is understood that other OCT systems can be used with OCT implementation 10. Such examples include, but not limited to, polarization sensitive OCT, spectral domain OCT, Fourier domain OCT, time-domain OCT, swept source OCT, and Doppler OCT.

Figure 6:
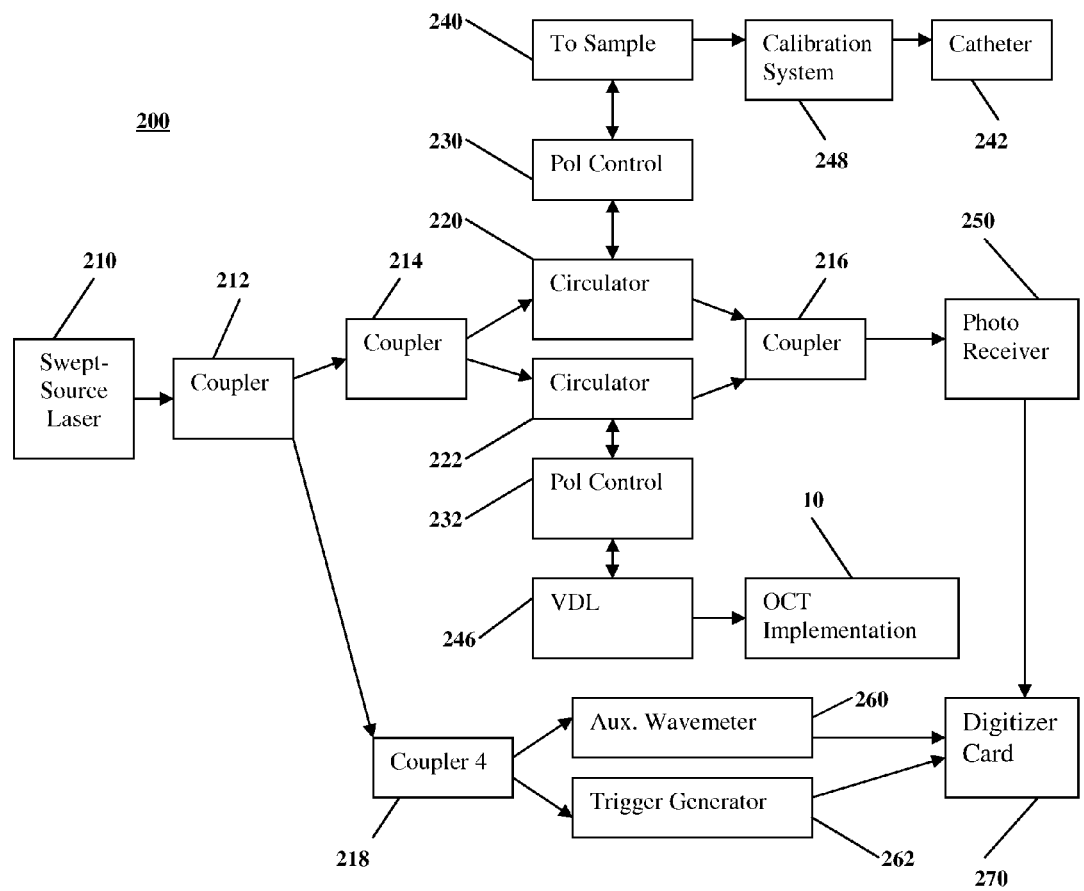
FIG. 6 is a schematic diagram of a SS-OCT system.

In one embodiment of the invention, as shown in FIG. 6, the OCT system can comprise, a Mach-Zehnder interferometer configuration in a SS-OCT implementation 200, which measures the complex mutual coherence function (magnitude and phase) between two non-reciprocal optical paths, one path encompassing an object under test (i.e. "the sample") and the other a reference path. This is in contrast to a Michelson interferometer configuration which measures the same coherence function in a reciprocal configuration (i.e. the same splitter/coupler is used for both input splitting and output recombination).

As shown in FIG. 6, The SS-OCT system has a light source 210 with cascaded fiber optic couplers to subdivide the source light into three primary modules (1) the primary OCT interferometer, (2) an auxiliary wavemeter interferometer 260, and (3) an optical trigger generator 262. In one embodiment of the invention, the light source 210 is a High Speed Scanning Laser HSL-2000 (Santee) with an instantaneous coherence length of over 10 mm. The swept laser source 210 includes emitted light with a mean frequency of the output spectrum that varies over time. The mean frequency of light emitted from the swept source may change continuously over time at a tuning speed that is greater than 100 terahertz per millisecond and repeatedly with a repetition period. The swept laser source may be any tunable laser source that rapidly tunes a narrowband source through a broad optical bandwidth. The tuning range of the swept source may have a tuning range with a center wavelength between approximately 500 nanometers and 2000 nm, a tuning width of approximately greater than 1% of the center wavelength, and an instantaneous line width of less than approximately 10% of the tuning range. Optionally, the swept laser source 210 is coupled to an electro-optic polarization modulator to modulate the polarization state of the source light periodically in time between two semi orthogonal polarization states.

As shown in FIG. 6, the auxiliary wavemeter 260 and the optical trigger generator 262 are for clocking the swept light source in order for providing an external clock signal to a high speed digitizer 270, as disclosed in commonly assigned application Ser. No. 60/949,467, filed Jul. 12, 2007, herein incorporated by reference. The Uniform Frequency Sample Clock signal is repeatedly outputted for each subsequent optical trigger that occurs as the laser is sweeping and the optical trigger is generated. The optical trigger is generated from the optical trigger generator 262. The high-speed digitizer card 270 is coupled to the output of the OCT interferometer, output of the auxiliary interferometer 260, the trigger signal from the trigger generator 262, and the arbitrary waveform generator. The high-speed PCI digitizer card 270 can be a dual-channel high resolution 16 bit, 125MS/s waveform for a PCI bus. The external sample clock signal is derived from an auxiliary optical wavemeter photoreceiver during a start-up calibration step, and then repeatedly outputted by the arbitrary waveform generator for each subsequent optical trigger signal that occurs as the laser is sweeping. The external clocking system allows for the wavemeter-generated clock signal to be filtered and processed in software before being outputted on the arbitrary waveform generator. Thus, the external clock derived from the auxiliary wavemeter is regenerated by the arbitrary waveform generator (Gage CompuGen) to allow acquisition of data directly in wavenumber (k) space.

Coupler 212 splits 90% of the light source power is split into the primary OCT interferometer and 10% into the coupler 218 for the auxiliary wavemeter 260 and trigger generator 262. A polarization modulator may be placed in the source path to modulate the polarization state of the light source periodically in time between two "semi-orthogonal" polarization states. The modulation cycle may be synchronized to the wavelength scan or during each A-line scan. Coupler 214 then splits the light 90% directed to port 1 of a 3-port polarization sensitive optical circulator 220 for the sample path and 10% of the light is directed to port 1 of a 3-port polarization sensitive optical circulator 222 for the reference path. Port 2 of circulator 220 for the sample path is coupled to a polarization controller 230 and to a sample 240. The polarization controller 230 may include, but is not limited to, a fiber-optic polarization controller based on bending-induced birefringence or squeezing. The polarization controller 230 can be used to match the polarization state of the reference arm to that of the sample arm. Alternatively, the polarization controller 230 may be a polarization control circuit. The sample path can be coupled to a probe or catheter 242 via a fiber optic rotary junction. Examples of a rotating catheter tip for the sample path include, a turbine-type catheter as described in Patent Cooperation Treaty application PCT/US04/12773 filed Apr. 23, 2004 which claims priority to U.S. provisional application 60/466,215 filed Apr. 28, 2003; or a rotating optical catheter tip as described in U.S. patent application Ser. No. 11/551,684, which claims priority to U.S. provisional application 60/728,48; or a rotating catheter probe as described in U.S. patent application Ser. No. 11/551,684; each herein incorporated by reference for the methods, apparatuses and systems taught therein. The catheter 242 can be located within a subject to allow light reflection off of subject tissues to obtain optical measurements, medical diagnosis, treatment, and the like.

The coupler 216 also receives from port 3 of optical circulator 222, where port 2 of optical circulator 222 includes a polarization controller 232 and a Variable Delay Line ("VDL") 246. The VDL 246 comprises of an input fiber, a retro-reflecting mirror on a translation stage, and an output fiber. A dial controls the variable length, or delay, inserted into the optical path. The typical length variance is about 6 cm, while the typical time delay is about 300 picoseconds. Alternatively, an adjustable phase delay system can be included to modulate phase, which includes a piezo-operated stage, to provide much finer phase control, e.g., in the sub-wavelength range. In contradistinction, the VDL provides for larger pathlength adjustments with micron-size adjustment being the smallest increments.

The OCT implementation 10 would be incorporated into the reference path 150, as to allow the detection path to be free from two photoreceivers for the vertical and horizontal beams. Rather a single photoreceiver 250 which could detect both the vertical and horizontal beams by the OCT implementation 10 in the reference path. Port 3 of the optical circulator 220 is then coupled to a 50/50 coupler 216 with outputs 3 and 4 to a photoreceiver 250. The reference and sample paths encompass the total optical path beginning at the split in coupler 214, into ports 1 of the circulators 220 and 222, out of and back into ports 2 of the circulators 220 and 222, out of ports 3 of the circulators 220 and 222, and ending at their combination in coupler 216.

The photoreceiver 250 comprise a detection element, such as an InGaAs photodiode and a transimpedance amplifier, which converts the electrical current signal generated by photons absorbed by the photodetector element into a voltage signal that can be read by the digitizer. Typically, some gain amplification is given at this stage or in a following stage, as well as some filtering for removing noise that is outside of the relevant electrical bandwidth. The gained and filtered voltage signal is digitized. The OCT interferogram [S(k)] is digitized at 16-bit resolution using a high-speed PCI digitizer board 270 (AlazarTech ATS660, Toronto, Canada) coupled to photoreceiver 250 and the primary OCT signal and auxiliary wavemeter 260 signal. The external clock derived from the wavemeter and regenerated by the arbitrary waveform generator (Gage CompuGen) allows acquisition of data directly in wavenumber (k) space. S(k) is converted using the Fast Fourier Transform (FFT) into the pathlength (z) domain. The magnitude of the transformed OCT A-scan [|S(z)|] represents the backscattered magnitude at depth z in the sample. The digitizer 270 is coupled to a computer processor, which is a state-of-the-art workstation with a fast multi-core processor, RAID striped disk array, and large RAM space.

In one embodiment of the invention, if the OCT system is coupled to catheter 242 then the sample path of the OCT system can propagate through a calibration system 248 including a plurality of retardation plates on the distal end of the sample path fiber to have its polarization state transformed, as shown in FIG. 6. The detected transformation will be different than the expected and actual transformation due to the ambiguity caused by the fiber optic. Polarization ambiguity in a fiber-based PS-OCT can change dramatically upon movement and bending of the fiber cable during catheterization procedures. Using the method described herein, the comparison of the detected transformation with the expected transformation of polarization in the system of retardation plates will provide calibration coefficients, such as the Jones matrix of the catheter fiber, to overcome the ambiguity and compensate or correct polarization data from back-scattering events happening distal to the calibration retardation plate system. Calculation of the absolute axis of birefringence from calibrated polarization data is discussed in the Optics Express 13(12), 4507-4518 (2005), herein incorporated by reference. An exemplary catheter for OCT systems is disclosed in common assigned provisional application Ser. No. 60/949,511, filed Jul. 12, 2007, herein incorporated by reference.

The calibration system 248 includes a system of retardation plates with at least a first birefringent material and a second birefringent material. If a PS-OCT approach is used to calibrate, each retardation plate must have enough thickness and reflectivity to be visualized in an OCT image. In one embodiment of the invention, each retardation plate can be visualized L concurrently with specimen imaging. The calibration retardation plate system can be imaged in the same A-scan if scan depth is sufficiently long, or with a separate interferometer (separate reference arm of different path length and separate readout) sharing only the sample path (catheter) fiber. Light must be focused/collimated and reflectivity chosen such that signal-to-noise ratio from surfaces of retardation plates is sufficiently high to avoid noise in calibration coefficients but not have detrimental self-interference patterns in the specimen imaging interferometer. One of the references would have to be looking at a non-focused image. In one embodiment of the invention, this method is useful for Doppler (phase) calibration. An example of Doppler OCT is disclosed in commonly assigned U.S. Pat. No. 6,665,456 entitled "Method and Apparatus for Differential Phase Optical Coherence Tomography".

Calibration may be used to detect absolute axis orientations using single mode fiber base PS-OCT. Calibration requires that some signal be collected from a known element distal to the entire fiber. There are several different embodiments for a calibration system in the distal, post-fiber portion of a catheter probe. In one embodiment, separate retardation plates are placed between collimating/focusing elements and a rotating/deflecting prism. The collimating/focusing elements can be GRIN lenses.

In another embodiment, dual-layered birefringent material is used as the capsule material of the catheter. In another embodiment, the sample beam is split with a partially reflective prism, which allows the transmitted portion to propagate to the calibrating retardation plates. Such an embodiment could be used for Doppler OCT calibration. In another embodiment, the sample beam is split with a dichroic wavelength-dependent prism and a separate light source is used to calibrate the fiber independently of the imaging beam. Such an embodiment allows the calibrating signal to be completely independent of the imaging signal. The calibration will be for a different wavelength than the imaging signal wavelength and Polarization Mode Dispersion ("PMD") will be adjusted and considered accordingly. In another embodiment, a separate interferometer is coupled to the sample path with the retardation plates, in order to separately image the retardation plate system. The separate interferometer includes a separate reference arm of different optical path length and separate readout.

The reflection and detected signal from calibrating retardation plates does not have to be a specular reflection, such as a shiny flat surface. The reflection and detected signal could also be backscatter from a weakly scattering birefringent material. Such scattering is minimized to prevent degradation in the specimen image, if the retardation plates are on a common path to the specimen.

Measurement of absolute axis determination using PS-OCT provides information about the orientation of fibrous proteins in tissue. Fibrous proteins can be strongly associated with mechanical tissue properties such as the tensile strength of cartilage or the organization of collagen in aneurysm walls.

This method may provide information useful for evaluating the vulnerability of aneurysms to rupture. The likelihood of an aneurism rupturing is related to the mechanical properties of collagen in the arterial walls. If collagen fibers are oriented regularly with the artery longitude, then there is reduced mechanical strength in the perpendicular (circumferential) direction. If aneurysms that contain a more random orientation of fibers (and thus distribute strength in both longitudinal and circumferential directions) are less likely to rupture, then PS-OCT is likely a valuable tool for assessing the vulnerability of aneurysms' mechanical strength. Fiber-based PS-OCT is capable of estimating absolute collagen orientation only when a known polarization reference is fixed to the distal scanning end as discussed in this disclosure.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical coherence tomography implementation device comprising:
    a. a reference arm optically coupled to an interferometer, wherein the reference arm includes a first reference path of optical energy and a second reference path of optical energy; and
    b. the first reference path of optical energy including a first polarization state and the second reference path of optical energy including a second polarization state, wherein the first polarization state is orthogonal to the second polarization state, and separating the first and second polarization states as a function of path-length difference rather than as a function of spatial location, wherein a detection arm is optically coupled to the interferometer and the detection arm is free from two photoreceivers or spectrometers for detecting the interference of the first polarization state and the second polarization state.

2. The optical coherence tomography implementation device of claim 1, wherein the reference arm further comprises:
    a. a polarization beam splitter coupled to the distal end of the reference arm, wherein the polarization beam splitter splits the optical energy into the first polarization state and the second polarization state;
    b. the distal end of the first reference path coupled to a first reference reflector and the distal end of the second reference path coupled to a second reference reflector.

3. The optical coherence tomography implementation device of claim 2, wherein the first reference path includes a first optical path length and the second reference path includes a second optical path length, whereby the first optical path length is less than the second optical path length.

4. The optical coherence tomography implementation device of claim 2, wherein the first reference path includes a time delay device.

5. The optical coherence tomography implementation device of claim 2, wherein the interferometer is a polarization sensitive Fourier Domain optical tomography system including a detector.

6. The optical coherence tomography implementation device of claim 1, wherein the reference arm further comprises:
    a. a single mode coupler coupled to the distal end of the reference arm, splitting the optical energy into the first reference path and the second reference path;
    b. the first reference path optically coupled to a polarization controller and a first reference reflector; and
    c. the distal end of the second reference path coupled to a second reference reflector.

7. The optical coherence tomography implementation device of claim 6, wherein the first reference path includes a first optical path length and the second reference path includes a second optical path length, whereby the first optical path length is less than the second optical path length.

8. The optical coherence tomography implementation device of claim 6, wherein the first reference path includes a time delay device.

9. The optical coherence tomography implementation device of claim 6, wherein the interferometer is a polarization sensitive Fourier Domain optical tomography system including a detector.

10. The optical coherence tomography implementation device of claim 1, wherein the reference arm further comprises:
    a. a retardation plate coupled to the distal end of the reference arm, wherein the retardation plate includes a partially reflecting surface and a fully reflecting surface; and
    b. the partially reflecting surface reflects the first polarization state and the fully reflecting surface reflects the second polarization state.

11. The optical coherence tomography implementation device of claim 10, wherein the first polarization state includes a first optical path length and the second polarization state includes a second optical path length, whereby the first optical path length is less than the second optical path length.

12. The optical coherence tomography implementation device of claim 10, wherein the first reference path includes a time delay device.

13. The optical coherence tomography implementation device of claim 10, wherein the interferometer is a polarization sensitive Fourier Domain optical tomography system including a detector.

14. A method of optical coherence tomography, comprising
    a. splitting a reference arm from an interferometer into a first polarization state and a second polarization state, wherein the first polarization state is orthogonal to the second polarization state, and separating the first and second polarization states as a function of path-length difference rather than as a function of spatial location; and b. detecting the interference from the first polarization state and the second polarization state in a detection arm optically coupled to the interferometer, wherein the detection arm is free from two photoreceivers or spectrometers to detect the interference of the first polarization state and the second polarization state.

15. The method of claim 14, wherein the splitting step further comprises:
   a. reflecting the first polarization state off a first reference reflector and reflecting the second polarization state off a second reference reflector;
   b. setting the first reference reflector at a different optical path length than the second reference reflector;
   c. recombining the first polarization state and the second polarization state into the polarization beam splitter; and
   d. directing the recombined first and second polarization states with a sample path to a detection path of the interferometer.

16. The method of claim 14, further comprising dividing the first and the second polarization states into two separate frequency bands with a difference in the Fourier-transformed scan depth.

17. The method of claim 14, further comprising:
   a. providing a differential delay between the first and the second polarization states in the reference arm; and
   b. multiplexing the interference fringes for the first and the second polarization states into two distinct regions of a single spectral scan.

18. The method of claim 14, further comprising coupling the reference arm to spectrometer based polarization sensitive Fourier Domain optical coherence tomography instrument.

19. The method of claim 14, wherein the splitting step comprises:
   a. coupling the reference arm to a coupler;
   b. coupling the first polarization state to a polarization controller;
   c. reflecting the first polarization state off a first reference reflector and reflecting the second polarization state off a second reference reflector;
   d. setting the first reference reflector at a different optical path length than the second reference reflector;
   e. recombining the first polarization state and the second polarization state into the coupler; and
   f. directing the recombined first and second polarization states with a sample path to a detector of the interferometer.

20. The method of claim 14, wherein the splitting step comprises:
   a. coupling the reference arm to a retardation plate including a partially reflecting surface and a fully reflecting surface;
   b. setting the partially reflecting surface at a different optical path length than the fully reflecting surface;
   c. reflecting a first polarization state off the partially reflecting surface and reflecting the second polarization state off the fully reflecting surface;
   d. recombining the first polarization state and the second polarization state into the reference arm; and
   e. directing the recombined first and second polarization states with a sample path to a detector of the interferometer.

* * * * *